FIG. I

INVENTOR
Robert I. Nagel & Sidney A. Heenan

ATTORNEY

Prangley, Baird, Clayton, Miller & Vogel

Jan. 28, 1964  R. I. NAGEL ETAL  3,119,894
WARNING LENS

Filed April 2, 1962  7 Sheets—Sheet 2

INVENTOR
Robert I. Nagel & Sidney A. Heenan
ATTORNEY

Prongley, Baird, Clayton, Miller & Vogel

Jan. 28, 1964  R. I. NAGEL ETAL  3,119,894
WARNING LENS

Filed April 2, 1962  7 Sheets-Sheet 5

*INVENTOR*
Robert I. Nagel & Sidney A. Heenan

*ATTORNEY*
Pringley, Baird, Clayton, Miller & Vogel

INVENTOR
Robert I. Nagel & Sidney A. Heenan
ATTORNEY
Prangley, Baird, Clayton, Miller & Vogel 3,119,894
WARNING LENS
Robert I. Nagel, Skokie, and Sidney A. Heenan, Park
 Ridge, Ill., assignors to Elastic Stop Nut Corporation
 of America, Union, N.J., a corporation of New Jersey
Filed Apr. 2, 1962, Ser. No. 184,036
11 Claims. (Cl. 88—57)

This invention relates to lenses and more particularly to warning or signalling lenses.

Among the objects of this invention are to provide a signalling or warning lens which projects a high luminous intensity beam of substantially uniform value projecting a peak intensity throughout a relatively wide horizontal viewing angle and over a narrower but still relatively wide vertical viewing angle; which in a large measure avoids orientation and aiming difficulties; to provide a warning lens capable of converting a beam of large spherical angle into a beam of paraxial rays, so that from a light source of relatively low intensity, positioned in close proximity to the inner surface of the lens, a high intensity beam within a predetermined warning or viewing zone may be created; to provide a lens having catadioptric ribs or rings on its rear surface so arranged as to reflect light rays through the lens body at predetermined varying angles as required to provide parallel rays on refraction from a front surface concentric to the rear surface; to provide a signalling lens having light collecting and reflecting means or elements formed on its rear surface and on its front surface a multiplicity of lenticular elements or sub lenses each of which forms an image about an axis parallel to the lens axis and preferably at a short distance from the front surface of the lens so that a multiplicity of small images of the light source appear to be formed on the surface of the lens; to provide a signalling lens having on its rear surface substantially parallel light receiving refracting surfaces and total light reflecting surfaces at varying angles to the axis of the lens such as to produce beams of paraxial rays for accurate direction and control by the front surface of the lens; to provide a warning lens projecting primary and secondary rectangular beams symmetrically disposed about the lens axis, the two providing a beam of substantially uniform intensity throughout the angular viewing range of the primary viewing zone and a luminous intensity throughout the viewing range between the primary and secondary zone which decreases with increase in the viewing angle; to provide a signalling lens having interspersed first and second optical surfaces or lenticular elements, or groups thereof, of predetermined proportionate focal lengths to provide interspersed beams.

Additional objects and advantages of the lens embodying the present invention will be more fully understood from the following description, when read in connection with the accompanying drawings in which.

Figure 4:
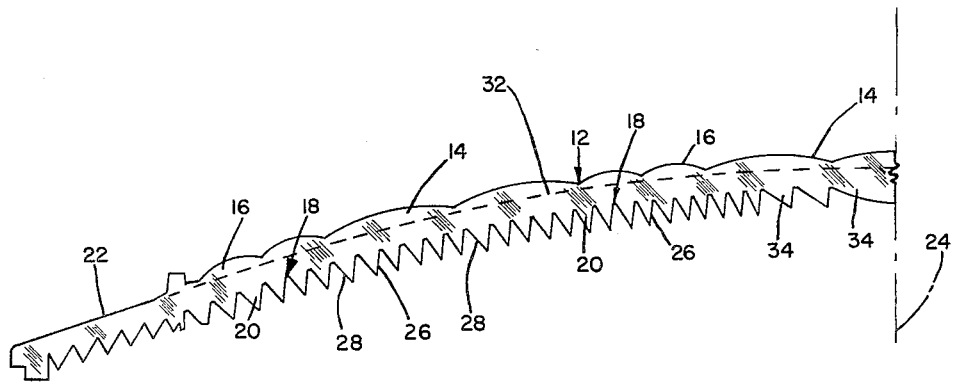
FIG. 4 is a partial cross-sectional view taken along the line 4—4 of FIG. 1.
Figure 3:
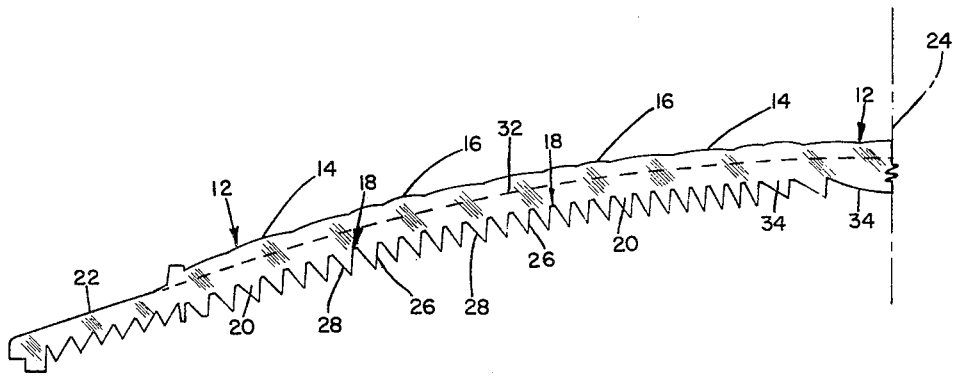
FIG. 3 is a partial cross-sectional view taken along the line 3—3 of FIG. 1.
Figure 5:
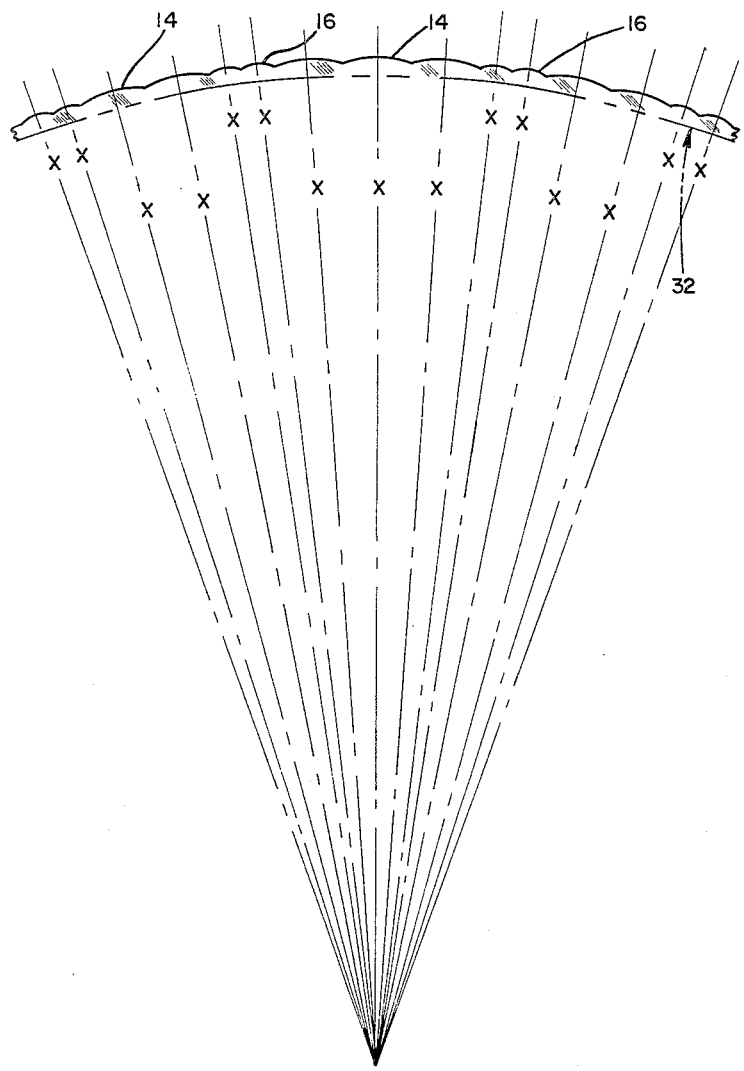
FIG. 5 is a schematic view showing a cross-section of a number of the optical surfaces on the front surface of the lens illustrated in FIG. 1 and their orientation in relation to the radius of the lens.

As shown in FIGS. 3 and 4, the lens 10 is provided with catadioptric rings 20 on its rear surface so arranged as to reflect light rays through the lens body at predetermined varying angles as required to provide parallel rays on refraction from a front surface concentric to the rear surface. For purposes of describing such arrangement the lens 10 may be considered as having a plain front surface 32.

The rear surface 18 of the lens 10 is formed with a plurality of ribs or continuous annular catadioptric rings 20 each having a light receiving and refracting surface 26 and a total light reflecting surface 28. In order to position the light source 30 (see FIG. 6) in close proximity to the inner face of the lens 10 so that the latter will accept light from the source 30 through a large spherical angle and to direct the light into a beam of paraxial rays through the body of the lens, and ultimately parallel rays on refraction from the front surface, applicants found it necessary to vary in a predetermined manner the angles which the reflecting surfaces 28 make with the axis of the lens.

Figure 6:
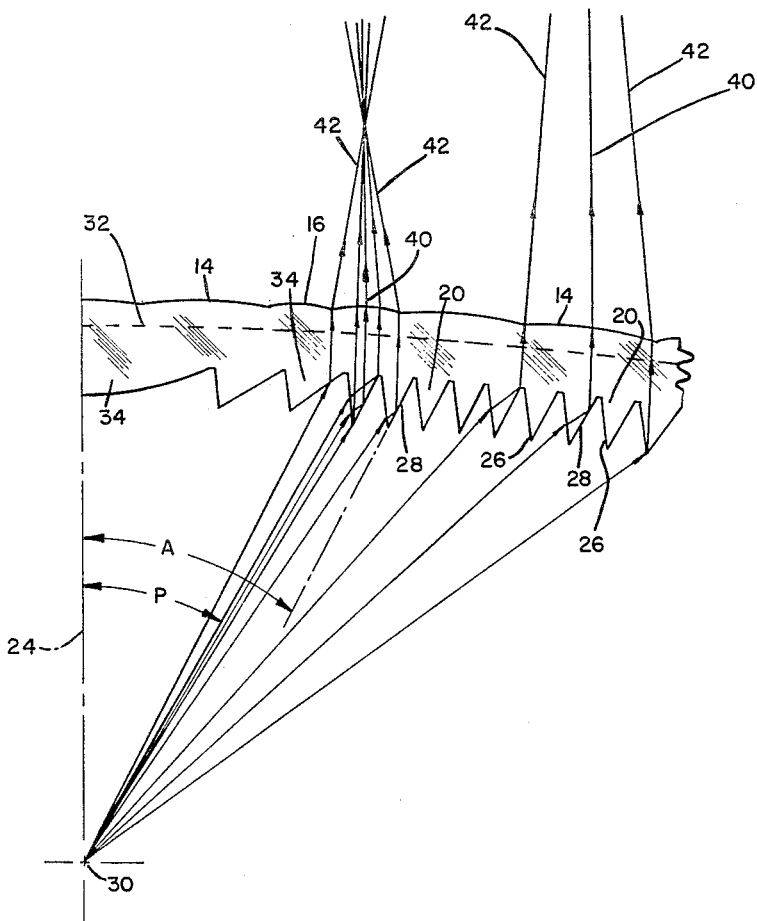
FIG. 6 is a partial central cross-sectional view with a number of light rays extending from a light source through the lens.

As illustrated in FIG. 6, there is a definite relationship between the angle hereinafter referred to as the angle P, formed between the axis 24 of the lens and a line from the light source 30, located on the lens axis, to the center of a particular refracting surface and the angle (hereinafter referred to as angle A) which the reflecting surface 28 must make to the axis of the lens in order to reflect light from the source through the lens body to provide parallel rays on refraction from the front surface. Stated another way, for a spherical lens of predetermined radius having a plurality of light collimating catadioptric rings, the angle which each light reflecting surface must make to the axis of the lens varies linearily with the log of the angle P of the primary ray.

Figure 9:
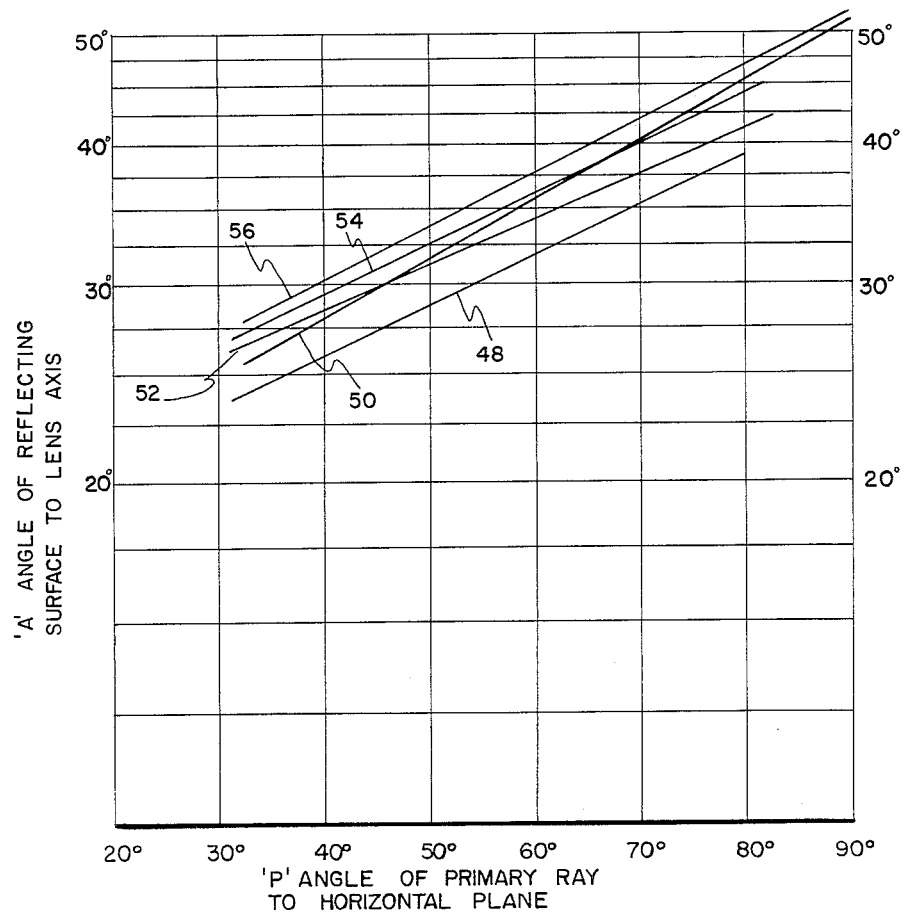
FIG. 9 is a semi-log chart of the angle of the primary ray to the horizontal plane plotted against the angle of the reflecting surface to the lens axis.

On the semi-log chart (FIG. 9) the angle A which the reflecting surfaces make to the lens axis is plotted against the angle P which the primary rays make to the horizontal plane, i.e., the lens axis, have lenses of 4″ and 8″ spherical radii and also of infinite spherical radius and having parallel refracting surfaces at two different angles to the axis of the lens.

The formula for the lines 48, 50, 52, 54 and 56 is log $A = C - K(90° - P)$ where the constants for the different lines are as follows:

| Line No. | Front Surface | Angle of the refracting surface to the axis of the lens, degrees | K | C |
|---|---|---|---|---|
| 48 | Flat | 5 | .0040 | 1.653 |
| 50 | 4″ spherical radius | 15 | .0051 | 1.7033 |
| 52 | Flat | 15 | .0045 | 1.6385 |
| 54 | 8″ spherical radius | 5 | .0045 | 1.6900 |
| 56 | 4″ spherical radius | 5 | .0046 | 1.7067 |

The lens 10 illustrated in FIGS. 3 and 4 is molded of a plastic material such as acrylic having an index of refraction of 1.49 and having an 8″ spherical radius. The central portion 34 of the rear surface 18 is formed with a number of dioptric rings and the remainder of the surface comprises twenty-eight continuous annular catadioptric rings 20, of which each refracting surface 26 makes an angle of 5° to the axis 24 of the lens, and the angles which the reflecting surfaces 28 make to the axis of the lens progress from 26° 45 minutes, for the ring adjacent to the central portion 34, to 44° 55 minutes for the ring furthest from the central portion 34. The angles of the reflecting surfaces 28 are varied according to the formula set forth above so that each ring 20 intercepts light rays from the source 30 and directs the light, in paraxial rays, i.e., at small angles to the radii of the imaginary spherical lens surface 32, through the body of the lens at such an angle that after refraction from the imaginary or base front surface 32 the rays would be parallel to the axis 24 of the lens.

It will be evident from the above that we have provided a one-piece molded lens where the light source may be positioned in close proximity to the inner surface of the lens, the lens being capable of collecting at least two-thirds of the lumens emitted by the light source 30.

Figure 1:
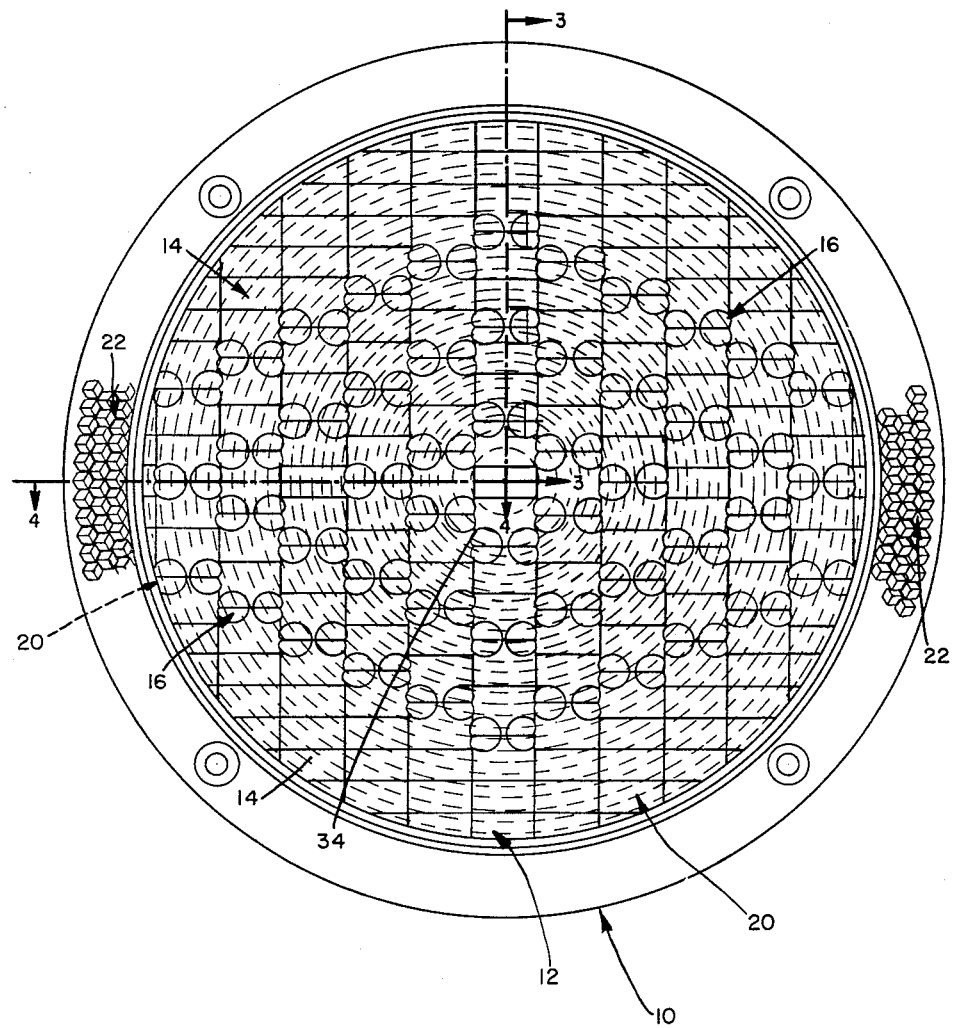
FIGURE 1 is a front elevation of a preferred form of lens embodying this invention.

Positioned on the front surface 12 of the lens 10 (see FIG. 1) is a grid of rectangular spheroidal shaped lenticular elements 14, of a given focal length, for directing light rays into a first or primary beam 44 (FIGURE 2) and a multiplicity of interspersed spheroidal shaped lenticular elements 16, of a different focal length then the elements 14, for directing light rays into a secondary beam 46 interspersed with the primary beam 44.

In order to obtain a uniformly illuminated lens surface which has greater attention getting power, each lenticular element or sub lens 14 and 16 is adapted to form a real image about a beam axis 40 (see FIG. 6) parallel to the lens axis at a short distance from the lens front surface 12 so that a multiplicity of images of the light source, or spots of light, appear to be formed on the surface of the lens. Therefore, at a distance from the lens, due to the limited resolving power of the human eye, the entire front surface of the lens appears to provide a uniformly illuminated surface or light source of high intensity.

As heretofore described, the catadioptric rings 20 on the rear surface 18 of the lens are adapted to project light from the source through the lens body such that the rays would emerge parallel to the axis of the lens if the lens had a plain front surface. In order to cause the chief or primary ray of each lenticular or individual lens element 14 and 16 to emerge parallel to the lens axis 24, each element 14 and 16 is positioned on the front surface of the lens with its optic axis normal to the base surface 32 of the lens. Therefore any ray passing through a lenticular element at the optic axis thereof will emerge parallel to the lens axis 24. All other rays 42, from the same point of the light source striking the surfaces 14 and 16 will converge on the focal point in front of the lens surface at which the real images are formed.

Figure 2:
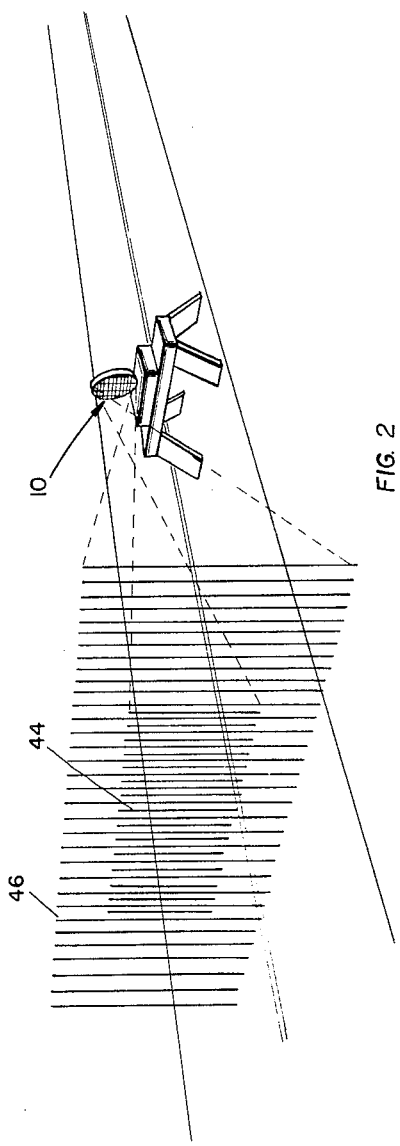
FIG. 2 is a schematic view of a light pattern projected by the lens illustrated in FIG. 1.

As heretofore stated and as illustrated in FIG. 2, the light beams from the lens 10 include a primary beam 44 and a secondary beam 46 larger than and including the primary beam. This superimposing of the beams increases the uniformity of intensity of the signal light when viewed within the primary zone and also provides a signal light beam of varying intensity when viewed within the secondary zone thereby in a large measure avoiding orientation or aiming difficulties.

Viewing the front surface of the lens from the secondary viewing zone 46, one would see a weaker signal than when viewing the lens from the primary zone 44 since the light intensity of the secondary beam is proportionately less than the intensity of the primary beam but nevertheless the signal within the secondary zone is sufficient to warn of impending danger. The lens illustrated in FIG. 1 directs approximately 76% of the light from the source into the primary viewing zone 44, and 24% of the light into the secondary viewing zone 46.

We have determined that the primary viewing zone 44 may have a spread in a horizontal plane of a minimum total angle of 8° and a maximum total angle of 24° and a spread in a vertical plane of a minimum total angle of 4° and a maximum total angle of 12°. In order to obtain this pattern, each arcuate surface 14 may subtend an angle between 16° and 48° in a horizontal direction and an angle between 8° and 24° in a vertical direction.

We have also found that the most desirable secondary viewing zone may have a spread of a minimum total angle of 10° and a maximum total angle of 24° and a vertical spread of a minimum total angle of 5° and a maximum total angle of 12°. In order to obtain this light pattern each arcuate surface 16 may be subtend as angle between 20° and 48° in a horizontal direction and an angle between 10° and 24° in a vertical direction.

Figure 7:
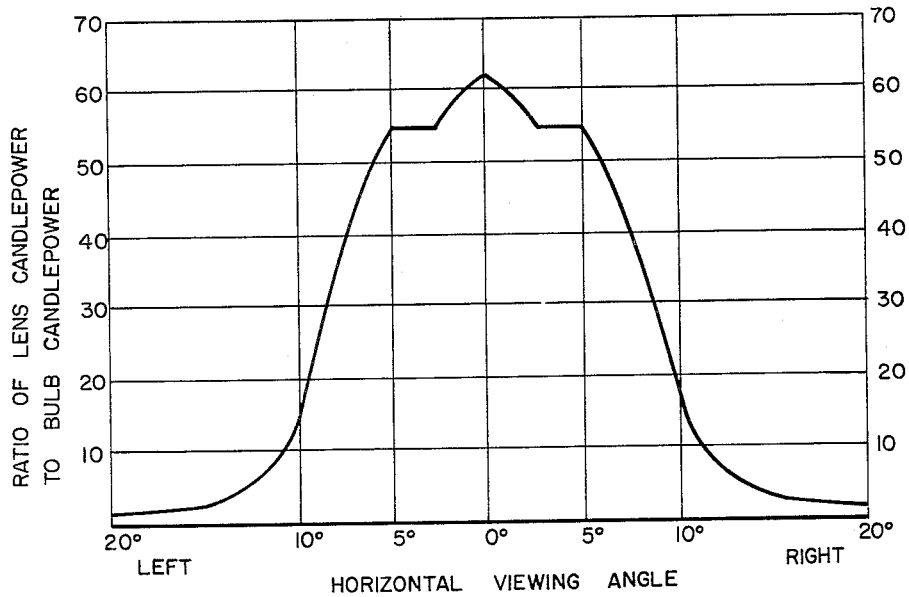
FIG. 7 is a horizontal viewing angle light distribution chart.
Figure 8:
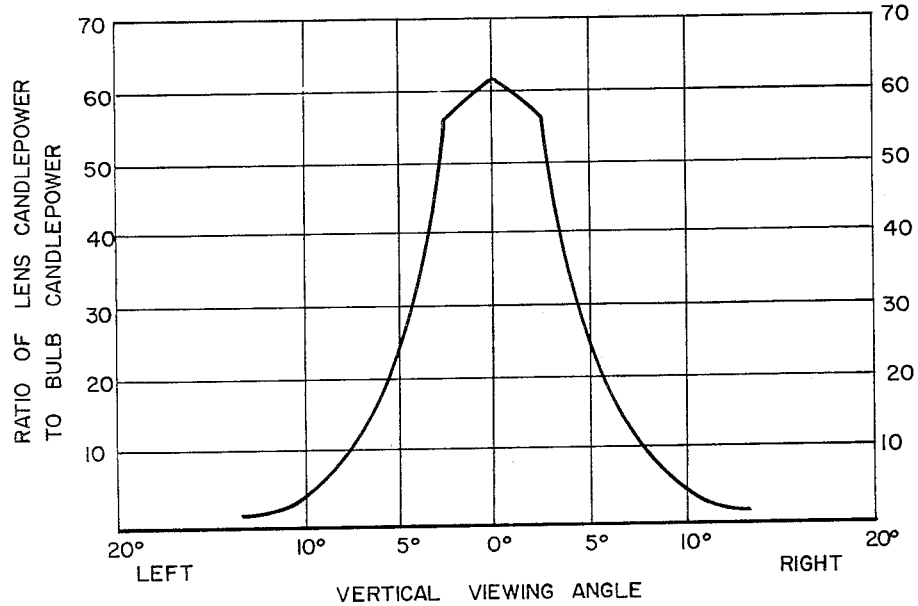
FIG. 8 is a vertical viewing angle light distribution chart.

Illustrated in FIGS. 7 and 8 are light distribution charts for the horizontal and vertical viewing angles of the lens described above.

Positioned around the optical, light directing, surfaces of the lens 10 is annular reflex reflector portion 22 comprising a number of individual reflecting elements 54 integrally joined to form a composite reflecting area. The individual reflecting elements 54, which are known as "triple-mirror" or reflex prisms, are so closely associated that the effect is that of a single large reflecting area. As explained in Patent No. 1,671,086, when a beam of light impinges on one of the reflecting surfaces, it is reflected from surface to surface about the axis of the prism and emerges back along the incident beam. Therefore, if the light source 30 should fail, any light from an external source striking the reflector portion will be reflected back towards the source, thereby giving a desired signal.

While we have illustrated and described a particular lens, it will, no doubt, be apparent to those skilled in the art that various changes may be made in the particular forms of the optic elements and that other forms are possible within the spirit of the invention. Hence, we desire that the foregoing be taken merely as illustrative and not in a limiting sense.

What is claimed is:

1. In a warning lens having
   (a) parallel front and rear base surfaces,
   (b) a plurality of successive catadioptric elements on the rear base surface, each of said elements comprising a light receiving and refracting surface and a total light reflecting surface positioned to receive and reflect the rays of refracted light received by the reflecting surface from said refracting surface,
   (c) the angles between the refracting surfaces and the corresponding reflecting surfaces progressively increasing as the perpendicular distance of the elements from the lens axis increases to reflect the light rays at predetermined angles to the front base surface for refraction into parallel rays on emission from the front base surface, and
   (d) a plurality of light focusing lenticular elements on said front base surface each having an axis, the axes of said lenticular elements being so related to each other and the front base surface and the direction of the light from the reflecting surfaces that each lenticular element produces a beam symmetrical about an axis with the axes of symmetry of all the beams being parallel.

2. In a warning lens having:
   (a) parallel front and rear base surfaces circular in cross section,
   (b) a plurality of successive catadioptric elements on the rear base surface, each of said elements comprising a light receiving and refracting surface and a total light reflecting surface positioned to reflect the rays of refracted light received by the reflecting surface from said refracting surface,
   (c) the angles between the refracting and the corresponding reflecting surfaces progressively increasing as the perpendicular distance of the elements from the lens axis increases to reflect the light rays at predetermined angles to the front base surface for refracting into parallel rays on emission from the front base surface, and
   (d) a plurality of light focusing lenticular elements on said front base surface each having an axis, the axes of said lenticular elements being so related to each other and the front base surface and the direction of the light from the reflecting surfaces that each lenticular element produces a beam symmetrical about an axis with the axes of symmetry of all the beams being parallel, and (e) the optical axes of the lenticular elements extending normal to the front base surface.

3. A warning lens as defined in claim 2 wherein said lenticular elements are spherical.

4. A warning lens as defined in claim 2 wherein said lenticular elements are spheroidal.

5. A warning lens as defined in claim 2 wherein said lenticular elements are rectangular spheroids.

6. In a warning lens having:

(a) parallel front and rear base surfaces, (b) a plurality of successive catadioptric elements on the rear base surface, each of said elements comprising a light receiving and refracting surface and a total light reflecting surface positioned to receive and reflect the rays of refracted light received by the reflecting surface from said refracting surface, (c) the angles between the refracting surfaces and the corresponding reflecting surfaces progressively increasing as the perpendicular distance of the elements from the lens axis increases to reflect the light rays at predetermined angles to the front base surface for refraction into parallel rays on emission from the front base surface, and (d) a plurality of light focusing lenticular elements on said front base surface each having an axis, the axes of said lenticular elements being so related to each other and the front base surface and the direction of the light from the reflecting surfaces that said lenticular elements produce a plurality of conical light beams each of the same angular width and each symmetrical about an axis with the axes of symmetry of all the beams being parallel.

7. In a warning lens having:

(a) parallel front and rear base surfaces, (b) a plurality of successive catadioptric elements on the rear base surface, each of said elements comprising a light receiving and refracting surface and a total light reflecting surface positioned to receive and reflect the rays of refracted light received by the reflecting surface from said refracting surface, (c) the angles between the refracting surfaces and the corresponding reflecting surfaces progressively increasing as the perpendicular distance of the elements from the lens axis increases to reflect the light rays at predetermined angles to the front base surface for refraction into parallel rays on emission from the front base surface, and (d) a plurality of first light focusing lenticular elements on said front base surface each having an axis, the axes of said lenticular elements being so related to each other and the front base surface and the direction of the light from the reflecting surfaces that each said lenticular element produces a first conical light beam symmetrical about an axis with the axes of symmetry of all the beams being parallel, and (e) a plurality of second light focusing lenticular elements interspersed with the first lenticular elements and of a different focal length from said first lenticular elements, each said second lenticular element having an axis, the axes of said second lenticular elements being so related to each other and the front base surface and the direction of the light from the reflecting surfaces that said lenticular elements produce a plurality of second conical light beams of different angular spread than the first light beams and symmetrical about axes parallel to the axes of symmetry of the first mentioned symmetrical beams.

8. A warning lens as defined in claim 7 wherein said first lenticular elements are rectangular spheroids.

9. A warning lens as defined in claim 7 wherein said second lenticular elements are spheroidal.

10. A warning lens as defined in claim 7 wherein the entire front base surface is covered with the first lenticular elements arranged in rows and columns and with the second lenticular elements interspersed in groups between adjacent ones of said first lenticular elements.

11. A warning lens having:

(a) parallel front and rear base surfaces, (b) a plurality of successive catadioptric elements on the rear base surface, each of said elements comprising a light receiving and refracting surface and a total light reflecting surface positioned to receive and reflect the rays of refracted light received by the reflecting surface from said refracting surface, (c) a plurality of first light focusing lenticular elements on said front base surface, each said element having an arcuate front surface subtending a predetermined angle between 16 and 18 degrees in a first direction and a predetermined angle between 8 and 24 degrees in a second direction perpendicular to the first direction, each said lenticular element having an axis, the axes of said lenticular elements being so related to each other and the front base surface and the direction of the light from the reflecting surface that each first lenticular element produces a beam symmetrical about an axis with the axes of symmetry of all the beams being parallel.

(d) a plurality of second light focusing lenticular elements interspersed with said first lenticular elements, each said second element having an arcuate front surface subtending a predetermined angle between 20 and 48 degrees in the first direction and subtending a predetermined angle between 10 and 24 degrees in the second direction, each said second lenticular element having an axis, the axes of said lenticular elements being so related to each other and the front base surface that said second lenticular elements produce beams symmetrical about axes parallel to the axes of symmetry of the first mentioned symmetrical beams.

References Cited in the file of this patent

UNITED STATES PATENTS

| | | |
|---|---|---|
| 593,045 | Cummings | Nov. 2, 1897 |
| 720,386 | Wadsworth | Feb. 10, 1903 |
| 752,429 | Wadsworth | Feb. 16, 1904 |
| 1,902,997 | Godley | Mar. 28, 1933 |
| 1,944,154 | Deckson | Jan. 23, 1934 |
| 1,955,597 | Lamblin-Parent | Apr. 17, 1934 |
| 1,960,148 | Gage | May 22, 1934 |
| 2,003,804 | Falge | June 4, 1938 |
| 2,748,263 | Franck et al. | May 29, 1956 |
| 2,762,912 | Onksen et al. | Sept. 11, 1956 |
| 2,831,394 | Heenan et al. | Apr. 22, 1958 |
| 2,907,249 | Hjermstad | Oct. 6, 1959 |
| 3,004,470 | Ruhle | Oct. 17, 1961 |

FOREIGN PATENTS

| | | |
|---|---|---|
| 561,726 | Canada | Aug. 12, 1958 |
| 603,666 | Germany | Oct. 5, 1934 |
| 620,639 | Great Britain | Mar. 28, 1949 |